(12) United States Patent
Dettinger et al.

(10) Patent No.: US 7,899,843 B2
(45) Date of Patent: Mar. 1, 2011

(54) EXPANDING THE SCOPE OF AN ANNOTATION TO AN ENTITY LEVEL

(75) Inventors: Richard D. Dettinger, Rochester, MN (US); Cale T. Rath, Byron, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/664,537

(22) Filed: Sep. 19, 2003

(65) Prior Publication Data

US 2005/0065958 A1    Mar. 24, 2005

(51) Int. Cl.
*G06F 17/30* (2006.01)
(52) U.S. Cl. .......................................................... 707/783
(58) Field of Classification Search .................. 707/1, 3, 707/4, 100, 783; 709/204
See application file for complete search history.

(56) References Cited

U.S. PATENT DOCUMENTS

| | | | |
|---|---|---|---|
| 5,924,074 A * | 7/1999 | Evans | 705/3 |
| 5,974,389 A * | 10/1999 | Clark et al. | 705/3 |
| 6,347,329 B1 * | 2/2002 | Evans | 709/202 |
| 6,725,227 B1 | 4/2004 | Li | |
| 2002/0016821 A1 * | 2/2002 | Son et al. | 709/204 |
| 2003/0120527 A1 * | 6/2003 | Palomo et al. | 705/7 |
| 2003/0204490 A1 * | 10/2003 | Kasriel | 707/2 |

OTHER PUBLICATIONS

Bargeron et al., Computer Networks, vol. 31, No. 11, 1999, pp. 1-11.*
Ramakrishnan R., Database Management Systems, The McGraw-Hill Companies, Inc., 1998, pp. 28-29.*
Dettinger et al., IBM U.S. Appl. No. 10/083,075, filed Feb. 26, 2002, "Application Portability and Extensibility Through Database Schema and Query Abstraction".
Dettinger et al., IBM U.S. Appl. No. 10/403,356, filed Mar. 31, 2003, "Dealing With Composite Date Through Data Model Entities".
Chatterjee et al., IBM U.S. Appl. No. 10/600,014, filed Jun. 20, 2003, "Universal Annotation Management System".

* cited by examiner

*Primary Examiner* — Cheyne D Ly
(74) *Attorney, Agent, or Firm* — Patterson & Sheridan, LLP

(57) ABSTRACT

Methods, systems, and articles of manufacture for creating and sharing an annotation associated with a data object other than the particular data object described by the annotation are provided. The annotation may be associated with an entity, even though the annotation may describe only a particular data object encompassed by the entity. By associating the annotation with the entity, the annotation may be made available to other users viewing information related to the entity, even if the particular data object described by the annotation is not displayed in the information being viewed.

12 Claims, 12 Drawing Sheets

EFFECT OF MODEL ENTITY ON QUERY RESULT FIELDS

ABSTRACT QUERY ( INITIAL )

Model Entity = 'Patient' — 602

Query Conditions
  Gender = 'Female' AND
  Glucose Test > 10

Result Fields
  Gender
  Glucose Test
  Age

— $202_I$

ABSTRACT QUERY ( EFFECTIVE )

Model Entity = 'Patient'

Query Conditions
  Gender = 'Female' AND
  Glucose Test > 10

Result Fields
  Gender
  Glucose Test
  Age
  Patient ID

EXPANDING THE SCOPE OF AN ANNOTATION TO AN ENTITY LEVEL

CROSS-REFERENCE TO RELATED APPLICATIONS

The present invention is related to the commonly owned, U.S. patent application Ser. No. 10/083,075, entitled "Application Portability And Extensibility Through Database Schema And Query Abstraction," filed Feb. 26, 2002, now U.S. Pat. No. 6,996,558 issued Feb. 7, 2006; Ser. No. 10/403,356, entitled "Dealing With Composite Data Through Data Model Entities," filed Mar. 31, 2003, now U.S. Pat. No. 7,054,877 issued May 30, 2006; and Ser. No. 10/600,014, now pending, entitled "Universal Annotation Management System," filed Jun. 20, 2003, now U.S. Publication No. 2004/0260714 published Dec. 23, 2004.

BACKGROUND OF THE INVENTION

1. Field of the Invention

The present invention relates to the field of data entry and retrieval and, more particularly, to a method and system for associating annotations with entities associated with a data object related to the annotation.

2. Description of the Related Art

There are well known methods for capturing and storing explicit knowledge as data, for example, in relational databases, documents, flat files, and various proprietary formats in binary files. Often, such data is analyzed by various parties (e.g., experts, technicians, managers, etc.), resulting in rich interpretive information, commonly referred to as tacit knowledge. However, such tacit knowledge is often only temporarily captured, for example, as cryptic notes in a lab notebook, discussions/conversations, presentations, instant messaging exchanges, e-mails and the like. Because this tacit knowledge is typically not captured in the application environment in which the related data is viewed and analyzed, it is often lost.

One approach to more permanently capture tacit knowledge is to create annotations containing descriptive information about data objects. Virtually any identifiable type of object may be annotated, such as a matrix of data (e.g., a spreadsheet or database table), a text document, or an image. Further, subportions of objects (sub-objects) may be annotated, such as a cell, row, or column in a database table or a section, paragraph, or word in a text document. An indexing scheme is typically used to map each annotation to the annotated data object or sub-object, based on identifying information, typically in the form of an index. The index should provide enough specificity to allow the indexing scheme to locate the annotated data object (or sub-object). Further, to be effective, the indexing scheme should work both ways: given an index, the indexing scheme must be able to locate the annotated data object and, given an object, the indexing scheme must be able to calculate the index for use in classification, comparison, and searching (e.g., to search for annotations for a given data object).

In many situations, portions of a collection of data, such as database rows, are roughly analogous to 'entities' or objects. As an example, a table with patient records may have a primary key which is a patient number (patient ID) and would likely also have a patient name (first and last), address, preferences, and the like. All the other information for a particular row may be regarded as being related to a 'patient entity' uniquely identified by the patient ID. Similarly, all the information for a particular row of information in a table of test results may be regarded as being related to a 'test result entity.' Some information may be related to more than one entity. For example, a patient's test results may be related to both patient and test results entities. Further, information related to a single entity may be contained in multiple tables. For example, demographic information related to a patient entity may be contained in a table of patient records, while test results for the same patient entity may be contained in a table of test results.

One potential problem, however, presented when capturing and sharing information in an annotation, is selecting the proper scope of an annotation describing data related to an entity. The problem may be described with reference to the table of exemplary query results (listing patient test results) shown in Table I below.

TABLE I

| Exemplary query results | | | |
|---|---|---|---|
| Patient Name | Test Name | Test Result | Test Date |
| John Doe | Hemoglobin | 12 | Jan. 24, 2003 |
| Jane Smith | Hemoglobin | 22 | Feb. 25, 2003 |

The test results for the second patient (Jane Smith) may be invalid, for example, because the patient forgot to fast before the test, possibly skewing the results. Accordingly, a user (e.g., a lab technician) may wish to create an annotation describing this situation and suggesting the test be re-run, for example, during the patient's next scheduled visit.

While there are several locations from which the user may choose to specify the annotation, none of these may be ideal to accomplish the desired result (make someone aware the patient should be retested). For example, the user may choose to associate the annotation with the row. However, this may not be ideal, as the information may span multiple tables (e.g., patient records and test results). Similarly, associating the annotation with the entire table of results is not appropriate, as the annotation concerns the test results for only one patient. Associating the annotation with the name column clearly is inappropriate, as the annotation is not applicable to the first patient (John Doe), whose test results are fine. However, associating the annotation with the particular name cell (Jane Smith) may not be ideal either, as many queries may not include name information (which may not be unique, as multiple patients may have the same name), preferring unique identifiers, such as a patient ID. While associating the annotation with the patient ID may be a logical choice, patient IDs are not available in the query results in TABLE I. In fact, in many cases, for security reasons, certain users may be prohibited from viewing any type of identifying information (e.g., patient IDs and names).

Accordingly, there is a need for methods and systems allowing a user to associate an annotation with an entity, regardless of whether information uniquely identifying the entity (e.g., a primary key) is displayed in query results. Preferably, the methods and systems will allow subsequent users viewing information related to the same entity to view the annotation, regardless of whether they are viewing the particular information described by the annotation.

SUMMARY OF THE INVENTION

The present invention generally is directed to methods, systems, and articles of manufacture for associating an annotation describing a particular data object with an entity encompassing the particular data object.

One embodiment provides a method of exchanging information. The method generally includes displaying first query results to a first user, receiving, from the first user, a data object selected from the first query results, providing an interface allowing the first user to create an annotation describing the selected data object and associate the annotation with a model entity having a corresponding model entity definition specifying a field related to the selected data object, and storing the annotation with a reference to the model entity.

Another embodiment provides a method of exchanging information via an annotation. The method generally includes providing an interface allowing a user to view query results, select a data object from the query results, and create an annotation with a scope related to the selected data object, and providing an interface allowing the user to expand the scope of the annotation to a model entity encompassing the selected data object.

Another embodiment provides a method of accessing data. The method generally includes displaying query results in response to issuing a query, wherein at least one data object in the query results is associated with a model entity having a corresponding model entity definition specifying a field related to the at least one data object, retrieving at least one annotation associated with the model entity, and providing an indication of the annotation associated with the model entity.

Another embodiment provides a computer-readable medium containing a program for exchanging information via annotations. When executed by a processor, the program performs operations generally including receiving, from a first user, an indication of a data object selected from a set of first query results, providing an interface allowing the first user to create an annotation describing the selected data object and associate the annotation with a model entity having one or more associated fields related to the selected data object, and storing the annotation with a reference to the model entity.

Another embodiment provides a system for sharing information via annotations generally including a set of one or more model entity definitions, each specifying one or more fields encompassed by a corresponding model entity, a query building interface and an annotation system. The query building interface is generally configured to allow a first user to build a first query and view first query results received in response to issuing the query. The annotation system is generally configured to allow the first user to create an annotation for a data object selected from the query results and associate the annotation with a first model entity encompassing a field related to the selected data object.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-2D illustrate relational views of software components according to one embodiment of the present invention.

DETAILED DESCRIPTION OF THE PREFERRED EMBODIMENTS

Figure 1:
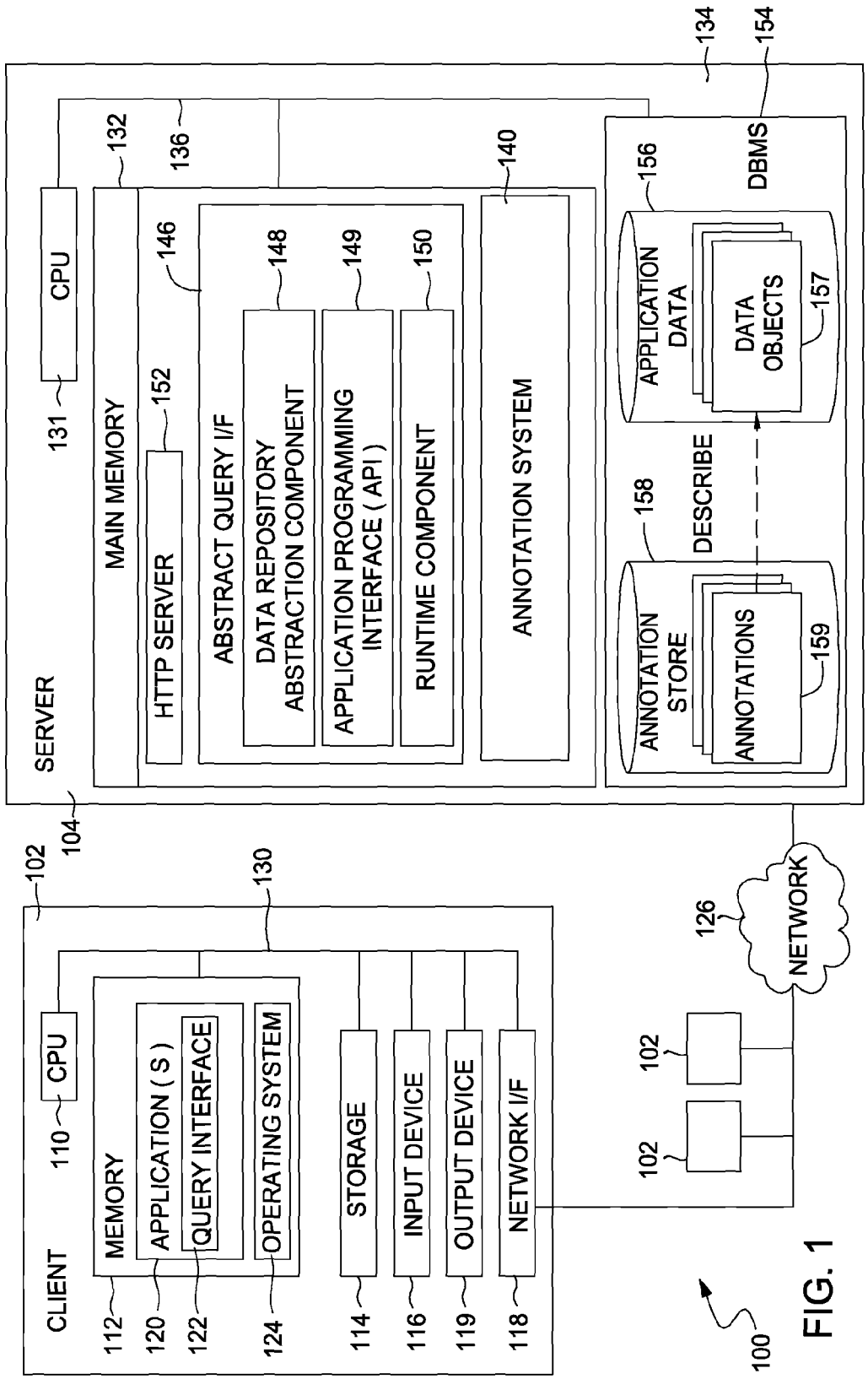
FIG. 1 is an exemplary computing environment in which embodiments of the present invention may be utilized.

The present invention provides methods, systems, and articles of manufacture for creating and sharing an annotation associated with a data object other than the particular data object described by the annotation. For example, the annotation may be associated with an entity, even though the annotation may describe only a particular data object encompassed by the entity. In other words, the scope of the annotation may be "pushed out" beyond the particular data object to the entire entity. By associating the annotation with the entity, the annotation may be made available to other users viewing information related to the entity, even if the particular data object described by the annotation is not displayed to the other users.

As used herein, the term model entity generally refer to a data object associated with a set of related fields. The set of related fields may be specified explicitly, for example, in a model entity definition or implicitly, for example, by reference to a primary key of a table or tables containing the set of related fields. As used herein, the term annotation generally refers to any type of descriptive information and may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation.

Further, as used herein, the term user may generally apply to any entity utilizing the annotation system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

In one embodiment of the present invention, a data model may be implemented as a data repository abstraction component containing a collection of abstract representations of physical fields of a searchable database (hereinafter "logical fields"). Thus, this data abstraction model provides a logical view of the underlying database, allowing the user to generate "abstract" queries against the data warehouse without requiring direct knowledge of its underlying physical properties. A runtime component (e.g., a query execution component) performs translation of abstract queries (generated based on the data abstraction model) into a form that can be used against a particular physical data representation.

The concepts of data abstraction and abstract queries are described in detail in the commonly owned, application Ser. No. 10/083,075, entitled "Improved Application Portability And Extensibility Through Database Schema And Query Abstraction," filed Feb. 26, 2002, now U.S. Pat. No. 6,996,558 issued Feb. 7, 2006, herein incorporated by reference in its entirety. While the data abstraction model described herein provides one or more embodiments of the invention, persons skilled in the art will recognize that the concepts provided herein can be implemented without such a data abstraction model while still providing the same or similar results.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Environment

FIG. 1 shows an exemplary networked computer system 100, in which embodiments of the present invention may be utilized. For example, embodiments of the present invention may be implemented as a program product for use with the system 100 (e.g., as part of a query building interface 122, query execution runtime component 150, and/or annotation system 140) to allow the capture and exchange of information between users performing related research. Queries may be generated via the query building interface 122 and may target data stored in an application data store 156. As will be described in greater detail below, annotations made via the annotation system 140, may be associated with an entity, although the annotations may actually describe only a particular portion of data related to the entity.

As illustrated in FIG. 1, the system 100 generally includes client computers 102 and at least one server computer 104, connected via a network 126. In general, the network 126 may be a local area network (LAN) and/or a wide area network (WAN). In a particular embodiment, the network 126 is the Internet. For other embodiments, however, the methods described herein may be performed on a single (e.g., non-networked) computer system.

As illustrated, the client computers 102 generally include a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a client 102 may include a display screen with an integrated touch-screen or a display with an integrated keyboard.

The network interface device 118 may be any entry/exit device configured to allow network communications between the client 102 and the server 104 via the network 126. For example, the network interface device 118 may be a network adapter or other network interface card (NIC). If the client 102 is a handheld device, such as a personal digital assistant (PDA), the network interface device 118 may comprise any suitable wireless interface to provide a wireless connection to the network 126.

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing the query building interface 122, such as a browser program, that, when executed on CPU 110, provides support for building queries based on a data repository abstraction (DRA) component 148. In one embodiment, the query interface 122 includes a web-based Graphical User Interface (GUI), which allows the user to display Hyper Text Markup Language (HTML) information. More generally, however, the query interface 122 may be any program (preferably GUI-based) capable of exposing a portion of the DRA component 148 on the client 102 for use in building queries. As will be described in greater detail below, queries built using the query interface 122 may be sent to the server 104 via the network 126 to be issued against one or more databases 156.

The server 104 may be physically arranged in a manner similar to the client computer 102. Accordingly, the server 104 is shown generally comprising a CPU 131, a memory 132, and a storage device 134, coupled to one another by a bus 136. Memory 132 may be a random access memory sufficiently large to hold the necessary programming and data structures that are located on the server 104.

The server 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used. As illustrated, the server 104 may be configured with an abstract query interface 146 for issuing abstract queries (e.g., received from the client application 120) against one or more of the databases 156.

In one embodiment, elements of a query are specified by a user through the query building interface 122 which may be implemented as a browser program presenting a set of GUI screens for building queries. The content of the GUI screens may be generated by one or more applications of the abstract query interface 146. In a particular embodiment, the GUI content is hypertext markup language (HTML) content which may be rendered on the client computer systems 102 with the query building interface 122. Accordingly, the memory 132 may include a Hypertext Transfer Protocol (http) server process 152 (e.g., a web server) adapted to service requests from the client computer 102. For example, the server process 152 may respond to requests to access the database(s) 156, which illustratively resides on the server 104. Incoming client requests for data from a database 156 invoke a server application which, when executed by the processor 130, perform operations necessary to access the database(s) 156. In one embodiment, the server application comprises a plurality of servlets configured to build GUI elements, which are then rendered by the query interface 122.

Components of the server computer 104 may be physically arranged in a manner similar to those of the client computer 102. For example, the server computer 104 is shown generally comprising a CPU 131, a memory 132, and a storage device 134, coupled to one another by a bus 136, which may all function as similar components described with reference to the client computer 102. The server computer 104 is generally under the control of an operating system (e.g., IBM OS/400®, UNIX, Microsoft Windows®, and the like).

As illustrated, the server computer 104 may be configured with the annotation system 140, also shown residing in memory 132. The annotation system 140 may be used to generate annotations 159 that, for some embodiments, may be stored in an annotation store 158 separate from the application data store 156. The annotations 159 may include a variety of annotations, for example, describing data in the application data store 156. The universal annotation system 111 may be any suitable type annotation system and, for some embodiments, may be similar to the universal annotation system described in the commonly owned, co-pending application Ser. No. 10/600,014, entitled "Universal Annotation System," filed Jun. 20, 2003, herein incorporated by reference.

An Exemplary Relational View

Figure 2A:
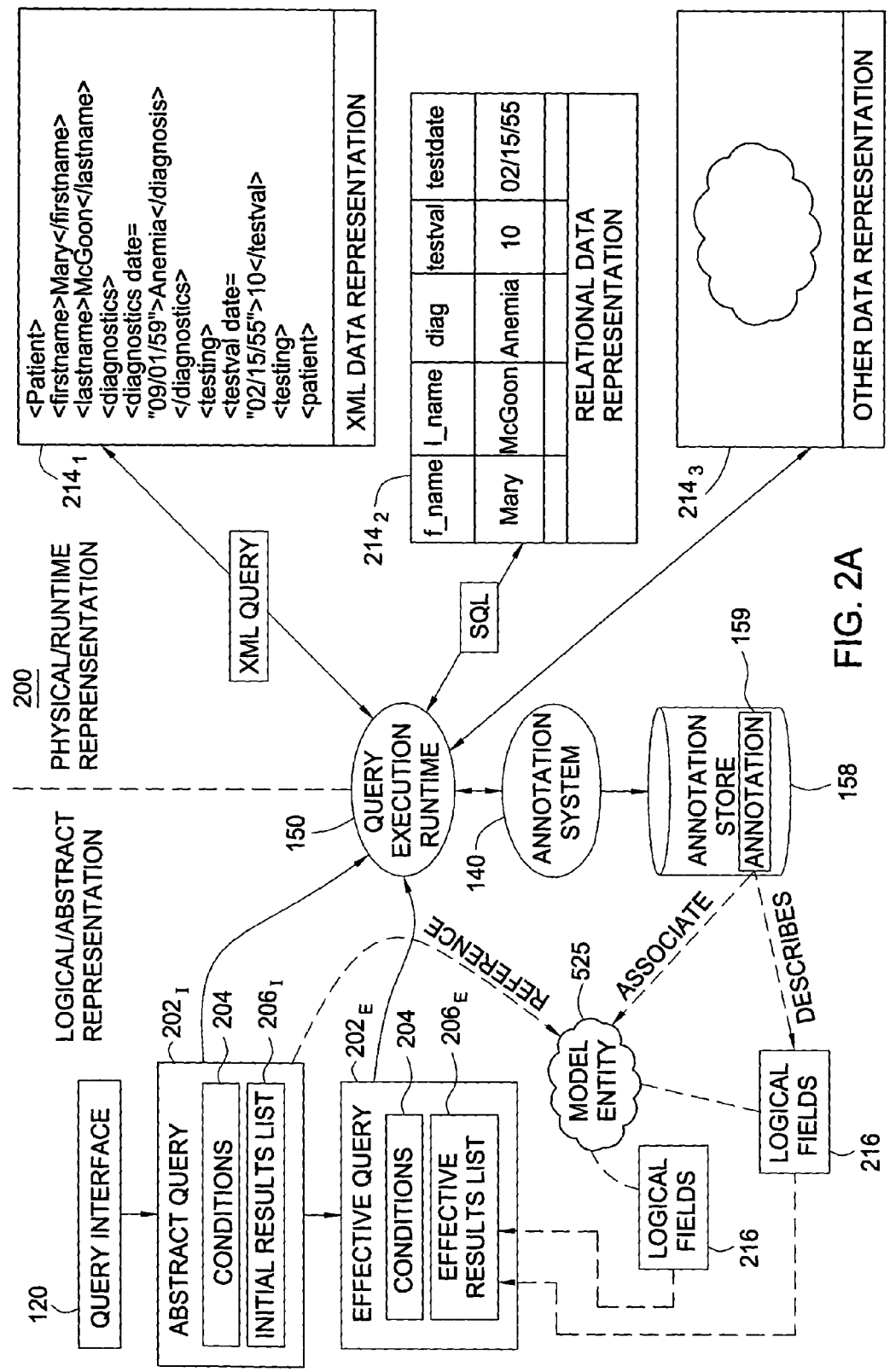

Operation of various components of the system 100 and concepts of model entities may be further described with reference to FIGS. 2A-2C. FIG. 2A illustrates a relational view of the query building interface 122, query execution runtime component 150, and annotation system 140, according to one embodiment of the invention. As shown, the abstract query interface 122 may be used to generate an initial abstract query $202_I$ to be issued by the query execution runtime component 150.

As illustrated, the abstract query $202_I$ may include a set of one or more query conditions 204 and an initial results list $206_I$, each based on logical fields defined in the DRA component 148. As previously described, abstract queries 202 may be executed by the query execution component 150. In the exemplary abstract data model, the logical fields are defined independently of the underlying data representation being used in the DBMS 154, thereby allowing queries to be formed that are loosely coupled to the underlying data representation 214.

Figure 2B:
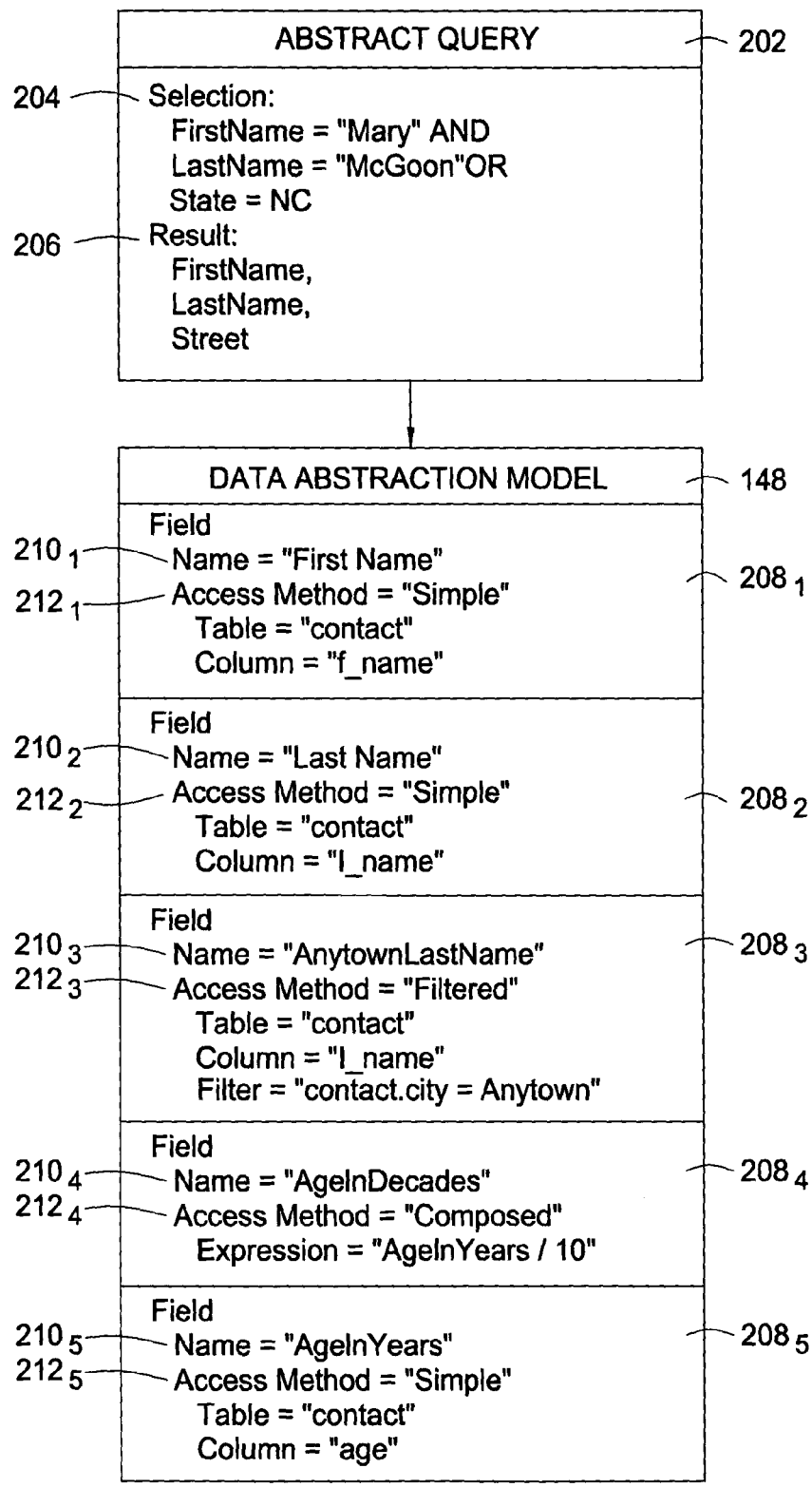

For example, as illustrated in FIG. 2B, the DRA component 148 includes a set of logical field specifications 208 that provide abstract representations of corresponding fields in a physical data representation 214 of data in the one or more databases 156 shown in FIG. 1. Each logical field specification 208 may include various information used to map the specified logical field to the corresponding physical field, such as field names, table names, and access methods describing how to access and/or manipulate data from the corresponding physical field in the physical data representation 214. The physical data representation 214 may be an XML data representation $214_1$, a relational data representation $214_2$, or any other data representation, as illustrated by $214_N$. Therefore, regardless of the actual physical data representation 214, a user may generate an abstract query 202 based on the logical fields defined by the logical field specifications 216, in order to access data stored therein.

Referring back to FIG. 2A, the query execution component 150 is generally configured to transform the abstract query 202 into a concrete query compatible with the physical data representation (e.g., an XML query, SQL query, etc), by mapping the logical fields of the expanded abstract query 208 to the corresponding physical fields of the physical data representation 214. The mapping of abstract queries to concrete queries, by the query execution component 150, is described in detail in the previously referenced co-pending application Ser. No. 10/083,075.

Model Entities

As illustrated, the initial abstract query $202_I$ may include a reference to a model entity (defined in a model entity specification 525). As will be described in greater detail below, upon executing the initial abstract query $202_I$, the initial results list $206_I$ may be supplemented with logical fields 216 specified in a model entity definition for the referenced model entity, resulting in an effective results list $216_I$. The concepts of model entities are described in detail in the commonly-owned, application Ser. No. 10/403,356, entitled "Dealing With Composite Data Through Data Model Entities," filed Mar. 31, 2003, U.S. Pat. No. 7,054,877 issued May 30, incorporated by reference herein.

As described in the above-referenced application, model entities may serve to identify a higher level abstraction of the underlying data by representing a composite of individual logical fields 216. Model entities may provide end users and applications a higher level conceptual view of the underlying data that can simplify data query and modification tasks (i.e., insert and deletion). Rather than having to understand all of the individual fields that make up entities such as a patient or a lab test result, the user/application can work at the more conceptual model entity level. As will be described below in more detail, the definition of a model entity contains sufficient metadata to streamline and simplify transactions performed against instances of a model entity.

For some embodiments, model entities are defined via additional metadata to that already found in an abstract data model representation (i.e., the DRA). More generally, however, model entities can be defined within an abstract data model definition or could be defined external to an abstract data model definition. Further, while embodiments are described herein with reference to relational databases, the invention is applicable to any other data representation including, for example, markup languages such as XML.

Figure 2C:
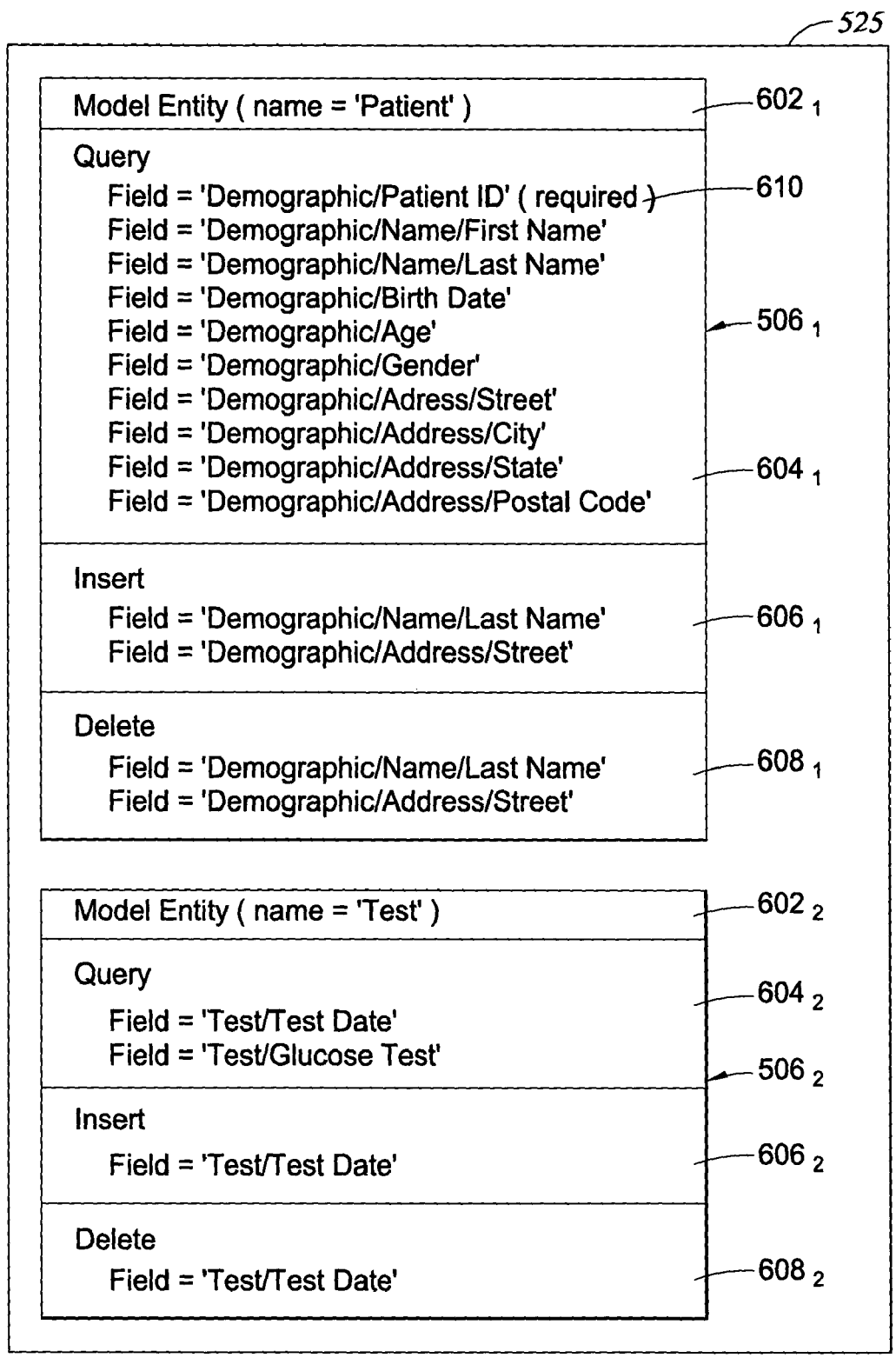

As illustrated in FIG. 2C, the model entity specification 525 defines a plurality of model entities 506, each identified by a name 602. Illustratively two model entities, a "Patient" model entity $506_1$, a "Test" model entity $506_2$ are shown. However, any number of model entities may be defined. In addition to the name 602, each model entity may define multiple sets of fields used to implement query, insert and delete operations against the physical data corresponding to the model entity.

Specifically, each model entity 506 may be partitioned to include a query portion $604_{1-2}$, the insert portion $606_{1-2}$ and a delete portion $608_{1-2}$. The appropriate portion may be accessed according to the type of operation being run against the model entity 506. Note that for queries, the full complement of fields defining a model entity (e.g., Patient) is specified, while in the case of inserts and deletes a subset of all the fields defining the model entity is specified.

It should be understood that a portion of a model entity 506 may include only a single logical field pointing to a single physical entity. Further, a model entity 506 may itself only have a single logical field pointing to a single physical entity. The model entities provide a particular advantage, however, when they span multiple fields/entities since in this case users are able to work with a singular abstract representation rather than being burdened with knowing what logical fields make up an abstract entity. In this regard, it is noted that, in practice, each portion (query, insert and delete) of a model entity 506 is itself a model entity in that the portions each define an abstract entity for a given operation, whether the abstract entity spans multiple logical fields and/or multiple physical fields.

As described in the application Ser. No. 10/403,356, model entity definitions may also include physical entity relationships specification which defines hierarchical relationships between entities in a physical model. For example, the physical entity relationships specification may define relationships between multiple tables containing data associated with a single model entity.

Query Operations Using Model Entities

In the case of query operations, a set of fields defined by the model entity 506 in the query portion 604 may serve a variety of purposes. First, the query portion 604 may specify fields that are required output from queries involving the model entity. As illustrated, required fields for query results may be identified in the query portion of the model entity by a "required" attribute. For example, the "patient" model entity $506_1$ defines "patient id" as a required field with the provision of a required attribute 610 in the query portion 604, thereby ensuring that all query results for patients will include patient id.

In any case, FIG. 2D illustrates an example of how the required attribute 610 may be applied to an initial abstract query $202_I$. The abstract query $202_I$ represents the initial form of an abstract query as specified by a user, for example. As illustrated, the abstract query $202_I$ may contain an explicit reference 602 to the "Patient" model entity $506_1$. As a result of this reference, the logic of the model entity specification 525, specifically the metadata of the Patient model entity $506_1$, is applied to convert the initial abstract query $202_I$ into an effective abstract query $202_E$. In this case, "Patient ID" was added to the result fields specified in the effective abstract query $202_E$ because the "patient" model entity $506_1$ defines "Patient id" as a required field with the provision of a required attribute 610.

For some embodiments, however, for security reasons, certain fields (even if listed as required) may not be displayed to certain users. As an example, a researcher may not be authorized to see a patient ID or name. However, the researcher may nonetheless be able to view test results and recognize particular results that look interesting (e.g., alarmingly high, out of range, or otherwise appear invalid). Even though the researcher is not authorized to view the patient ID, it would be desirable for the researcher to have the ability to create an annotation describing the test results and have that annotation available to subsequent viewers of information related to the patient. One way to accomplish this would be to provide the researcher with the ability to create an annotation for the test results and specify that the scope of the annotation should be "pushed out" beyond the test results to the patient entity level. In so doing, subsequent users viewing information related to the patient entity may be able to view the annotation, even if they are not viewing the particular information (e.g., test results in this example) described by the annotation.

Associating Annotations with Entities

Figure 3A:
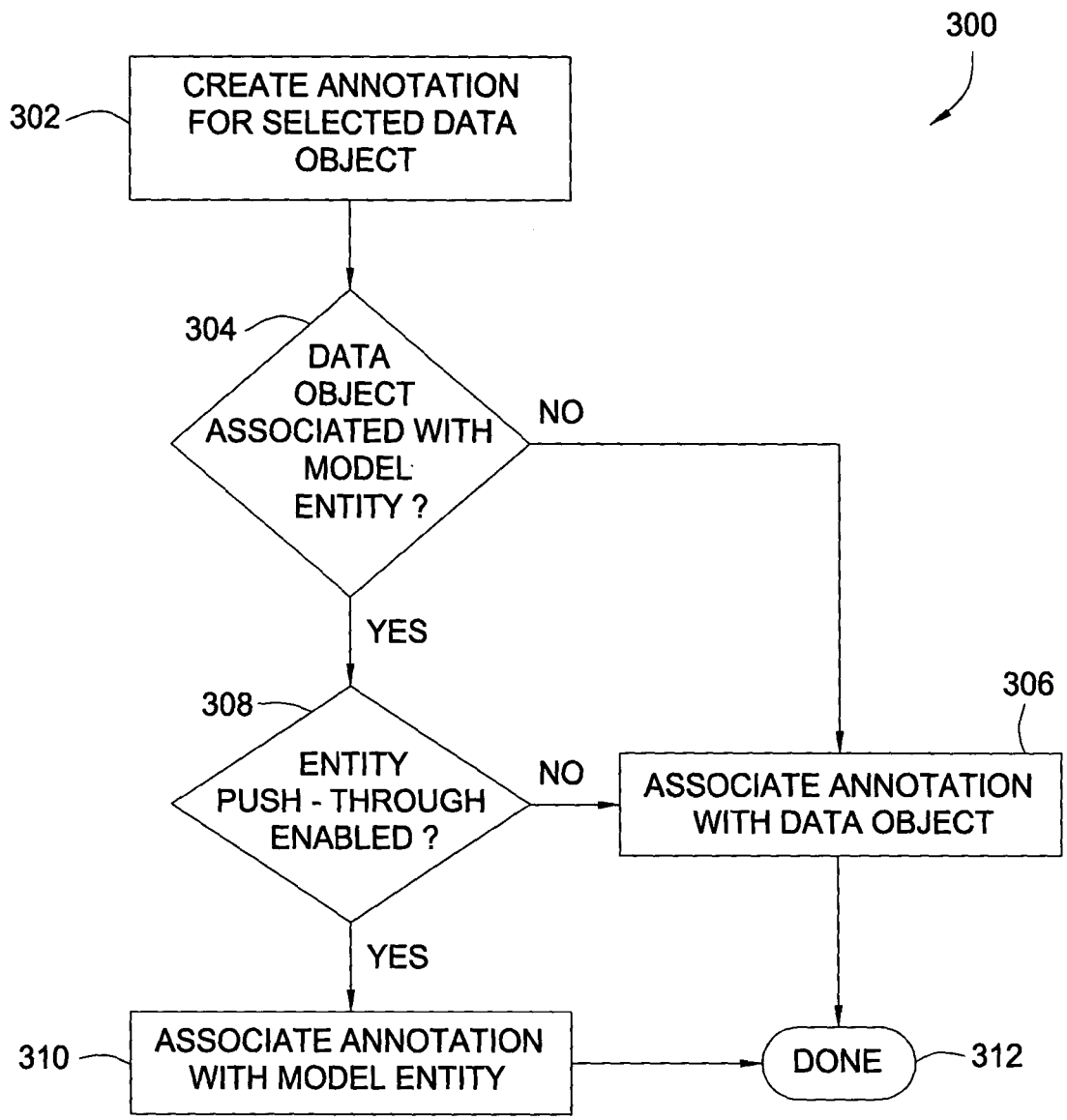
FIGS. 3A and 3B are flow charts illustrating exemplary operations for capturing and sharing annotations associated with an entity according to one embodiment of the present invention.
Figure 3B:
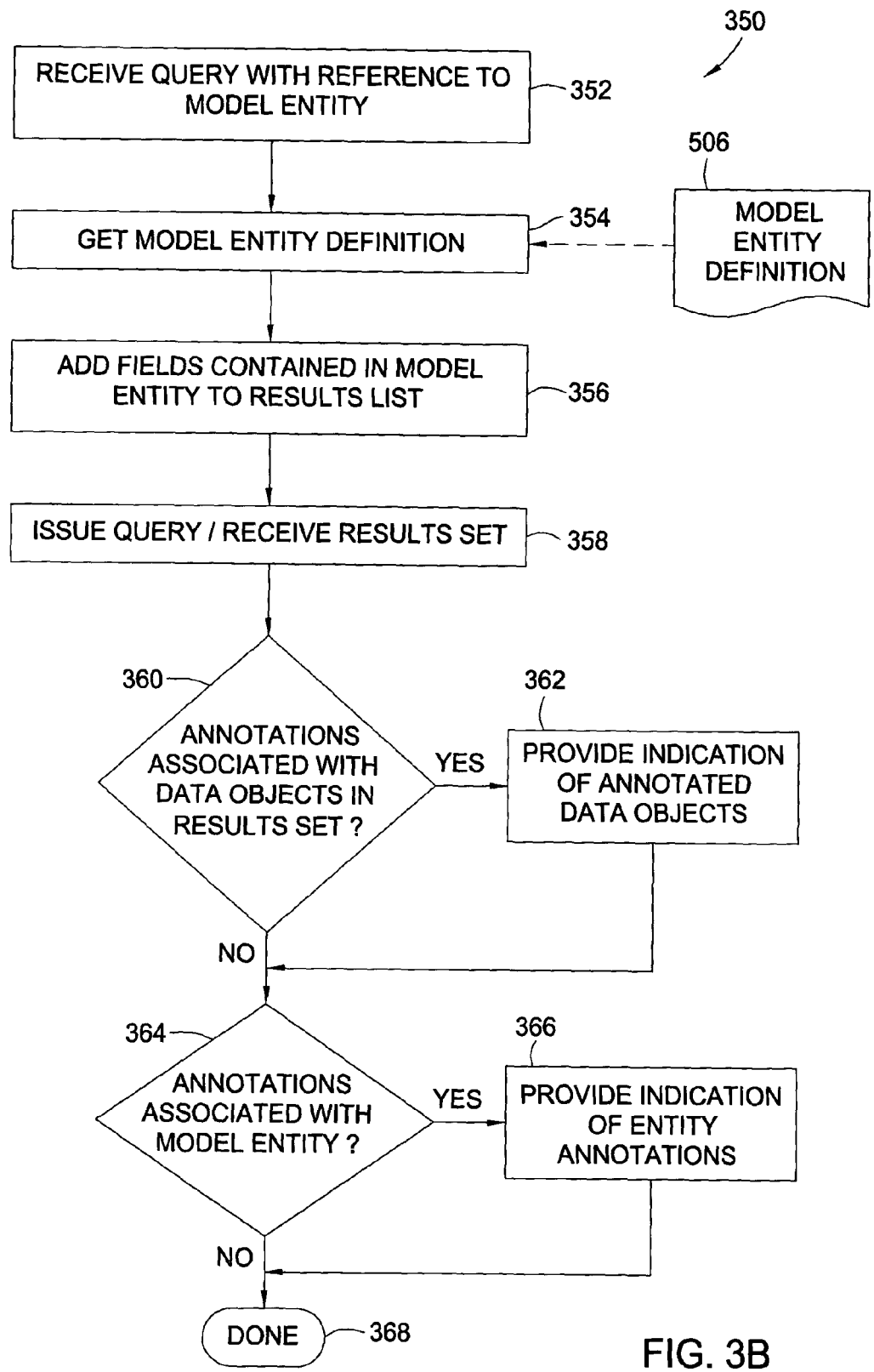

FIGS. 3A and 3B illustrate exemplary operations 300 and 350 for creating and viewing an annotation associated with an entity, respectively. Interestingly, the operations 300 and 350 may be performed during query building sessions for different users. In other words, an annotation created by a first user during a first session may be viewed by a second user during a second session. Further, as will be illustrated in the following example, by associating the annotation with a model entity, the first user may allow the annotation to be viewed by the second user even if the second user's query results do not contain the particular data object described by the annotation.

In any case, the operations 300 and 350 may be best described with reference to the exemplary graphical user interface (GUI) screens illustrated in FIGS. 4A-4D. The GUI screens may be provided, for example, as components of the query building interface 122 and/or annotation system 140.

The operations 300 begin, at step 302, by creating an annotation for a selected data object. For example, a first user may have issued a query and obtained a table of query results 401, as shown in the exemplary GUI screen 400 of FIG. 4A, and the user may wish to create an annotation for a data object related thereto. For example, the table 401 may include a group of cells, each corresponding to a value of a field/column in a particular row of the table 401. Various techniques may be used to allow the creation of annotations for one or more of the cells, columns, rows, or the entire table 401 itself.

For example, a check box 402 may be displayed adjacent each cell value, allowing a user to specify cells for which annotations are to be created. For some embodiments, users may be able to create annotations of differing scope (e.g., describing different data objects), via an Annotation Scope pull-down menu 406. For example, the user may be able to specify a row, column, or table annotation scope, causing similar check boxes 402 to be displayed adjacent the rows, columns, or table, accordingly.

As illustrated, the user may choose to annotate a particular value 408 of a test result, for example, that the user finds particularly relevant (e.g., the results may be particularly high, low, outside an expected range, or otherwise interesting). After selecting the check box 402 adjacent the value 408, the user may access the GUI screen 410 of FIG. 4B, for example, via a Create Annotations button 404. The GUI screen 410 may indicate the annotation author at 412 and provide a text box 414 for entering a comment.

As illustrated, the user may comment that the annotated test result appears invalid, as being much greater than an expected maximum value, possibly indicating that the test was performed improperly or the data was entered incorrectly, and that the results are likely invalid. In either case, the annotation may also serve to alert a subsequent user viewing data related to the corresponding patient that the test should be rerun. If the annotation is associated only with the selected test result, a subsequent user would likely only see the annotation if the test results were being viewed. However, it would be desirable for the subsequent viewer to see the annotation if they were viewing any information related to the patient. In other words, the user entering the annotation may wish to have the annotation scope expanded (e.g., pushed out) to encompass the patient as an entity, rather than just the selected data object. This expansion may be accomplished by associating the annotation with a patient model entity, if one exists.

Therefore, at step 304, a determination is made as to whether the data object selected for annotation is associated with a model entity. If not, the user may only have the option of associating the annotation with the selected data object, at step 306. However, if the selected data object is associated with a model entity, the user may be given the option to associate the annotation with a model entity, for example, via a checkbox 416. In other words, if a model entity exists and its entity definition includes the data object being annotated, the checkbox 416 may be enabled (otherwise, the checkbox 416 may be disabled or not displayed at all). As illustrated, a user may also be able to specify, via a checkbox 418, that a reference to the annotated data object be generated. As will be described below, with reference to FIG. 4E, the reference may effectively provide subsequent viewers of the annotation with a link to the data described thereby.

If more than one model entity exists that includes the data object being annotated in its entity definition, the user creating the annotation may be presented with a list allowing the user to associate the annotation with one or more of the corresponding entities. As an illustration, in the current example, the selected test results field may be included in a patient model entity definition, as well as a test results model entity, and the user may wish to associate the annotation with both.

At step 308, a determination is made as to whether entity push through is enabled, for example, via the check box 416 or any other means (e.g., as a configurable default). If not, the annotation is associated with the selected data object, at step 306. However, if entity push through is enabled, the annotation is associated with a model entity, at step 310. In either case, the operations 300 are exited, at 312, for example, by storing the annotation in an annotation record, along with the reference to the selected data object and/or one or more model entities.

One approach to associate the annotation with the model entity is to store a specific reference to the model entity (e.g., by name) with the annotation, along with information describing the instance value of the model entity related to the data described by the annotation, such as a primary key cell (e.g., the patient ID). In fact, it should be appreciated that associating an annotation with a primary key cell of a table containing data described by an annotation may allow the scope of annotations to be effectively "pushed out" to a higher level, even if no explicit model entity definitions are in place.

In other words, annotations may be associated with a primary key cell even if that primary key cell is not displayed to the user creating the annotation. To create the association, for example, the primary key cell may be looked up based on one or more other pieces of data (e.g., a patient name, date of birth, etc.).

In any case, by allowing a user to push out the scope of an annotation (e.g., to a defined model entity or a primary key), the user may, in effect, be able to create annotations for data the user is not even authorized to view. As an illustration, in the current example, the user may not be authorized to view any identifying patient information (names, patient IDs, etc.). Nonetheless, by associating annotations with a model entity (or primary key cell), the user can capture useful information and share this information with other users viewing information related to the patient, which may be of great benefit, as described below with reference to the exemplary operations 350 of FIG. 3B.

Viewing Annotations Associated with Entities

Figure 4A:
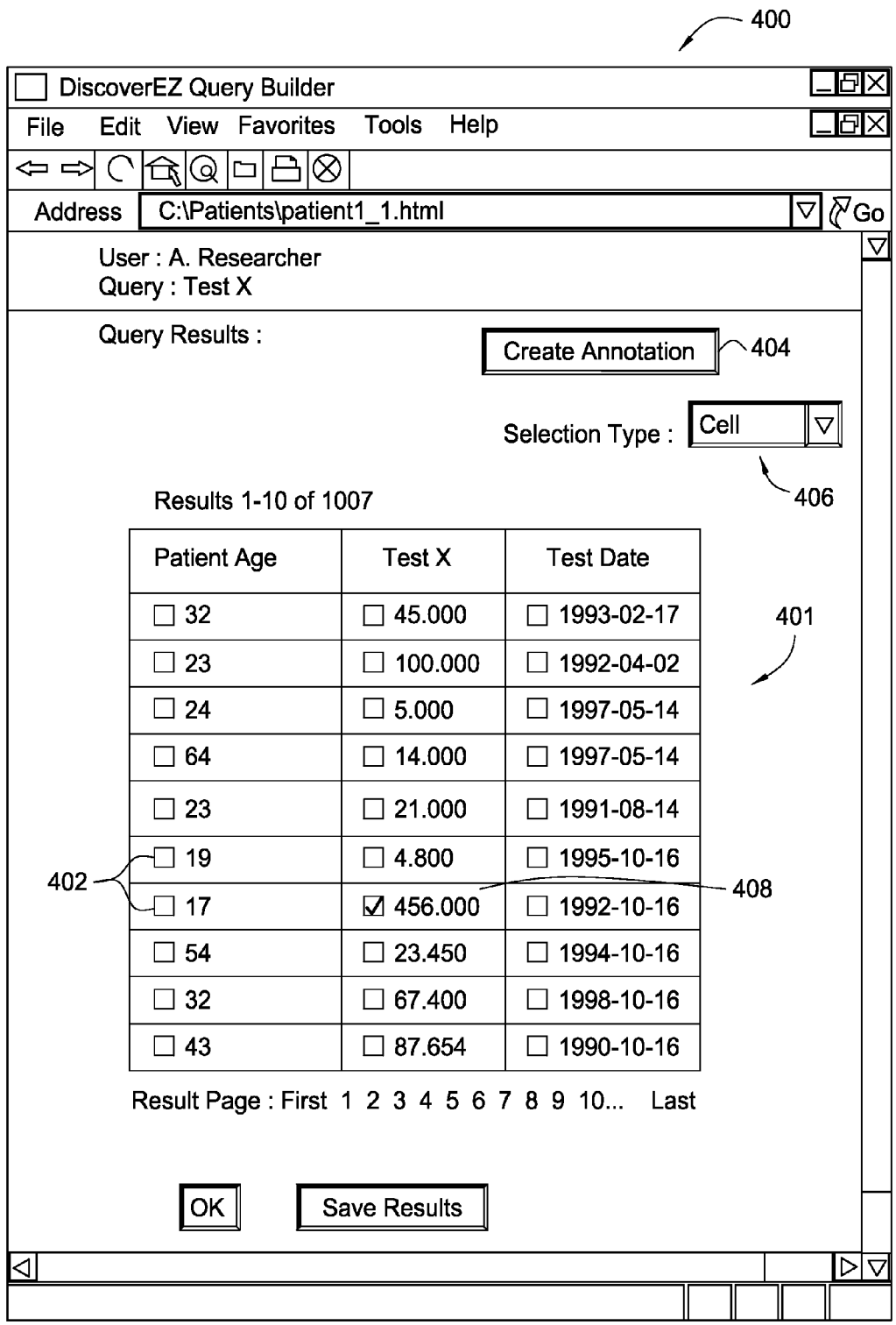
FIGS. 4A-4E illustrate exemplary graphical user interface (GUI) screens in accordance with one embodiment of the present invention.
Figure 4B:
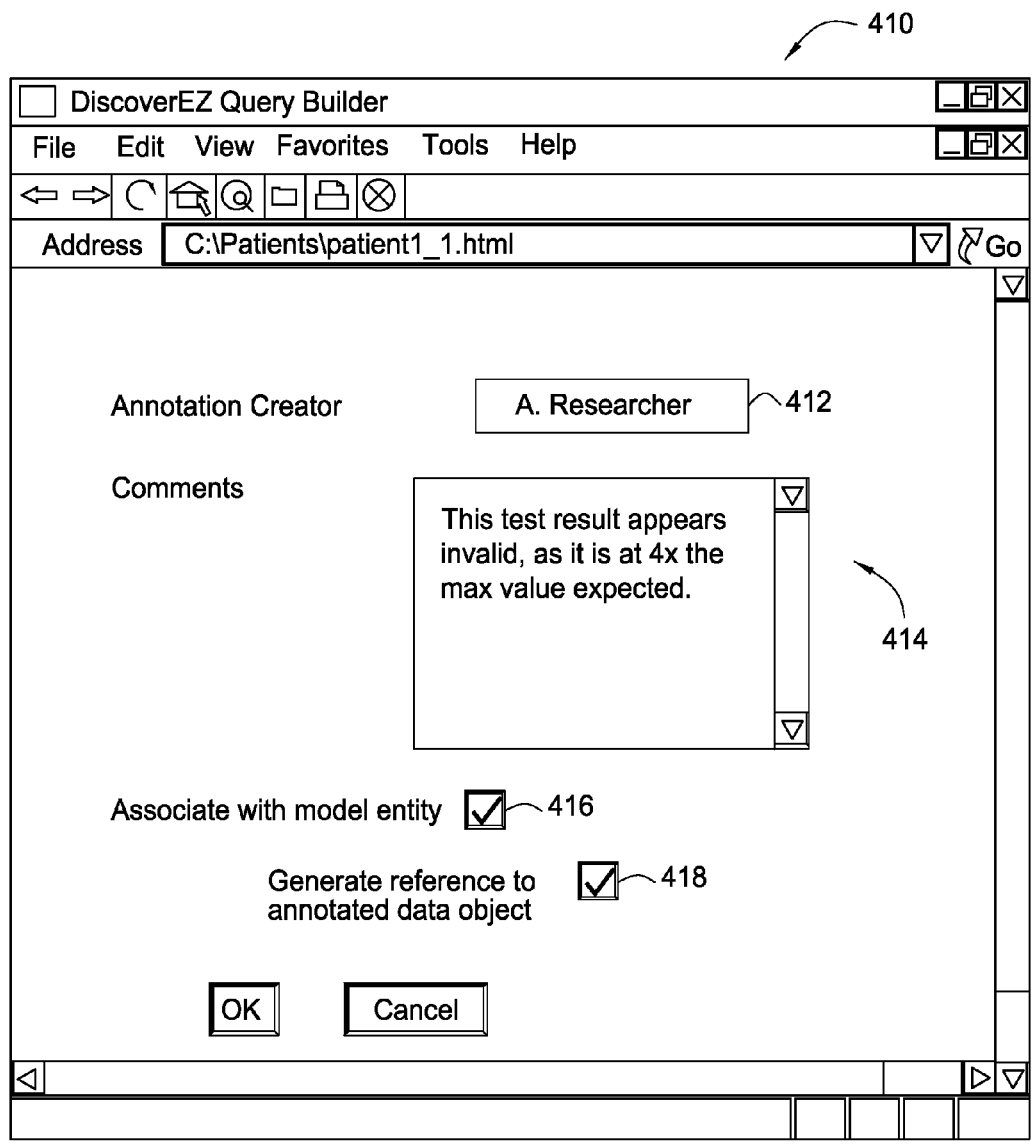
Figure 4C:
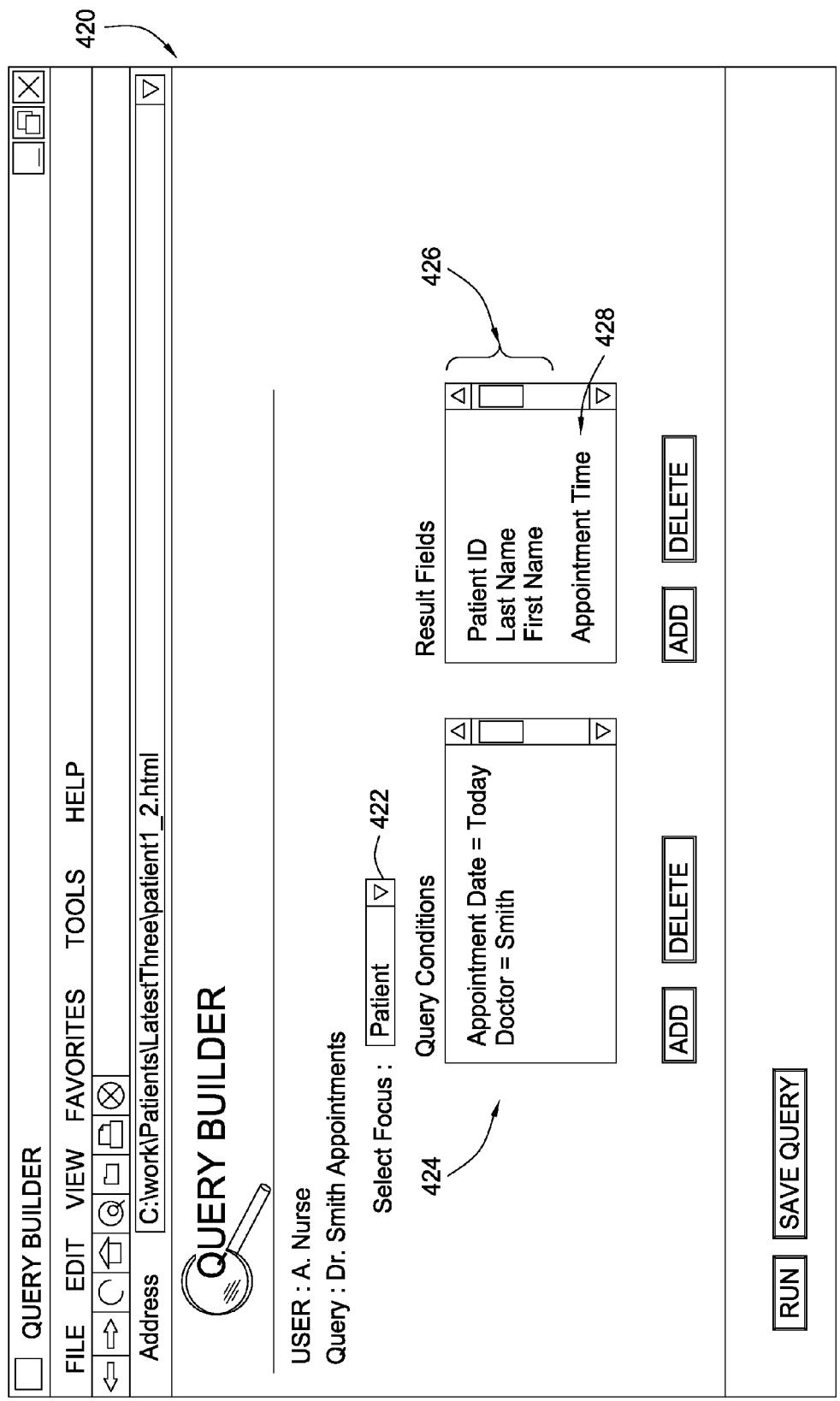

The exemplary operations 350 may be best described with an example illustrated with reference to GUI screens 420-440, shown in FIGS. 4C-4E, respectively. The example illustrates a query building session of a nurse generating a list of patients for a doctor. As will be described, the list of patients may include the patient whose test results were described by the annotation generated in the example above. Although the nurse may not view the annotated test results in the query results, because the annotation was associated with the patient model entity, the annotation may still be displayed to the nurse.

The operations 350 begin, at step 352, by receiving a query with reference to a model entity. For example, as described above, with reference to FIG. 2D, a query may have an explicit reference to a model entity by name. In some cases, a reference to a model entity may be added by selecting a focus for the query, for example, via a pull down menu 422 listing one or more available model entities, as shown in the query building GUI screen 420 of FIG. 4C. Alternatively, rather than contain an explicit reference to a model entity, the query may reference a model entity implicitly, through the specification of query results including fields contained in one or more model entity definitions.

At step 354, the model entity definition for the model entity referenced by the query is obtained. The fields contained in the model entity definition are optionally added to the results list of the query, at step 356, for example, as described above with reference to FIG. 2D. A list of fields 426 associated with an exemplary patient model entity are shown in FIG. 4C. At step 358, the query is issued and a set of query results is received. As illustrated in FIG. 4D, the set of query results 431 may include a list of patients, by name, along with an associated appointment time.

If any annotations are associated with data objects in the results set (e.g., cells, columns, or rows), as determined at step 360, an indication of such is provided at step 362. The existence of annotations for data objects may be found, for example, by querying the annotation store 158 for annotations 159 containing references to the data objects in the query results 431. Techniques for determining a set of annotations associated with a set of data objects are described in detail in the commonly-owned patent application Ser. No. 10/600,382, now pending, entitled, "Heterogeneous Multi-Level Extendable Indexing For General Purpose Annotation Systems" filed Jun. 20, 2003, now U.S. Publication No. 2005/0203876 published Sep. 15, 2005, hereby incorporated by reference in its entirety. To facilitate understanding, the present example assumes there are no annotations explicitly associated with data objects in the query results 431.

At step 364, however, a determination is made as to whether annotations exist for a model entity referenced by the query and, if so, an indication of such is provided, at step 366, prior to exiting the operations 350, at step 368. Annotations for the model entity may be retrieved, for example, using the techniques described in the above-reference application Ser. No. 10/600,382. As described in application 10/600,382, in some cases, even if an annotation exists, a user may only be able to view the annotation if the user has corresponding credentials (e.g., a user ID, a specified role, security level, and the like) that provide authority to view the annotation.

Figure 4D:
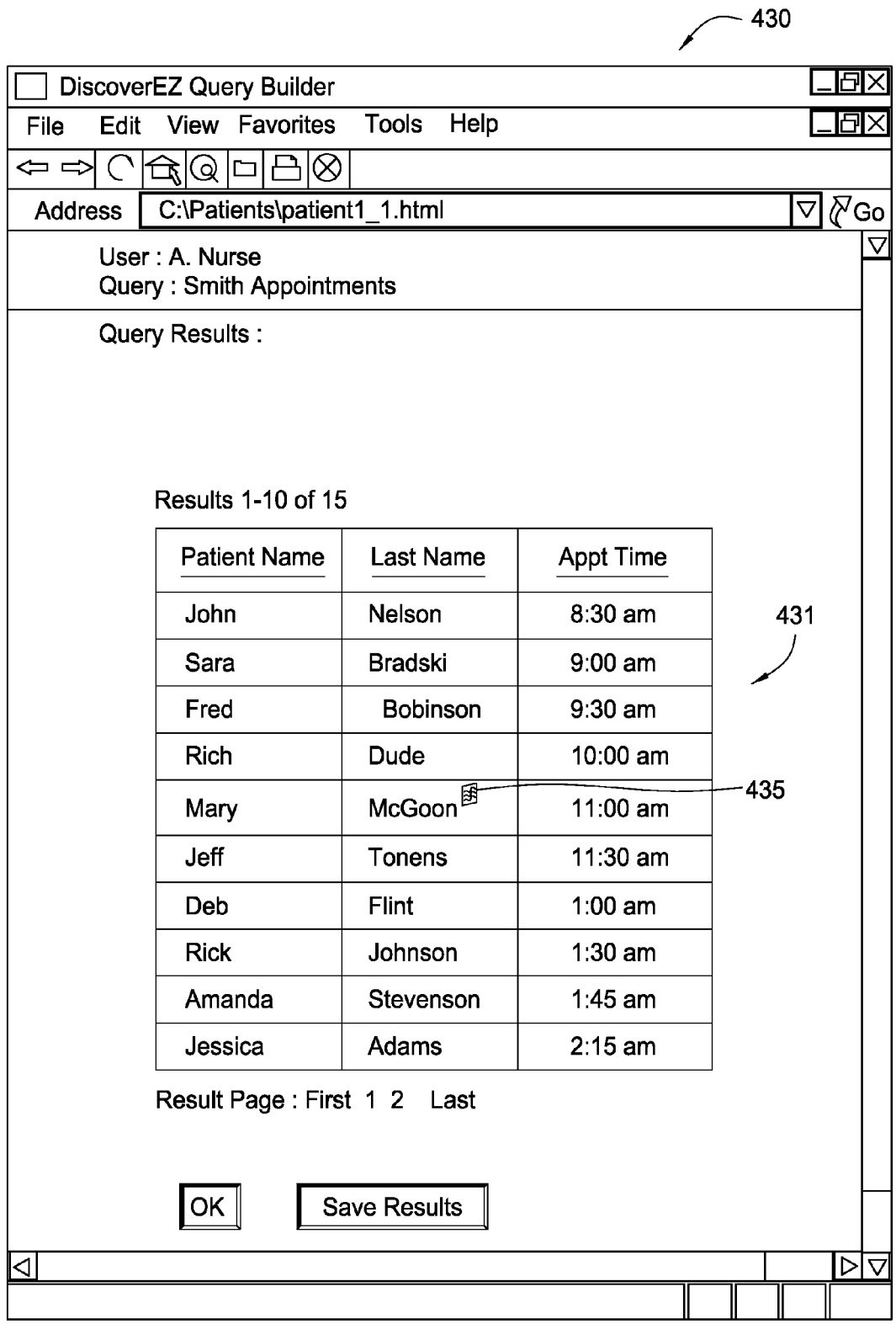

In any case, assuming the user is authorized to view the annotation, indication of the annotation for the model entity may be provided as an annotation icon 435, as illustrated in FIG. 4D. As the annotation is associated with the patient model entity rather than any particular data object, it may be displayed at any location deemed appropriate. For example, as illustrated, the annotation icon 435 may be displayed by the last name of the corresponding patient.

Figure 4E:
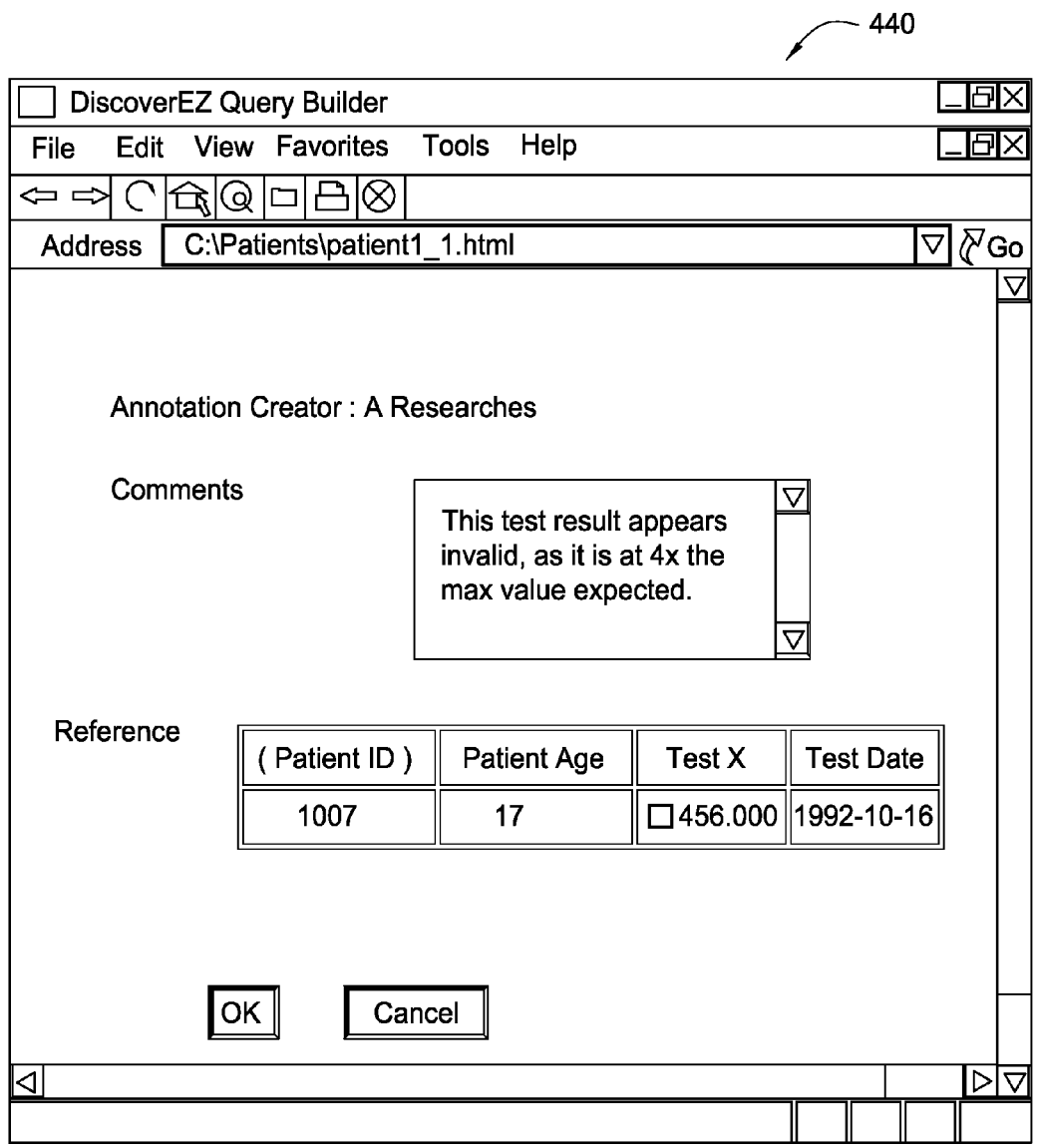

In order to display the annotation, the user may select (e.g., click on) the annotation icon 425, resulting in the View Annotation GUI screen 440, shown in FIG. 4E, presenting the user with the annotation. As illustrated, the GUI screen 440 may also display the actual data described by the annotation. In other words, the GUI screen 440 may provide the same view of the actual data described by the annotation that the user creating the annotation had. For example, when creating the annotation the user may have specified that a reference to the annotated data object be generated, as described above with reference to FIG. 4B. In response to viewing the annotation, the nurse may schedule the patient for re-testing during the upcoming visit.

Of course, those skilled in the art will recognize that the incorrect data scenario portrayed in the invalid test results example illustrates just one of many ways in which "pushing out" the scope of an annotation to the entity level may allow users to exchange information about data. Other examples include exchanging insightful information regarding particular data regarded as interesting (e.g., a user's interpretation of particularly interesting test results, or other type of data). Further, associating annotations with a model entity may facilitate gathering available information regarding an instance of the model entity. For example, in a business enterprise, an annotation "roll-up" feature may allow human resources personnel to quickly gather and view all annotations related to a particular employee, for example, by searching for annotations that contain a reference to the particular employee's ID (which may be used as a primary key).

CONCLUSION

By extending the scope of an annotation beyond a particular data object described by the annotation to a higher level entity, such as a model entity, embodiments of the present invention may facilitate the sharing of information related to the entity. In some cases, a first user may create an annotation describing a particular data object selected by the first user. By associating the annotation with a model entity encompassing the particular data object, the first user may allow the annotation to be viewed by a second user, regardless of whether the second user actually views the particular data object.

While the foregoing is directed to embodiments of the present invention, other and further embodiments of the invention may be devised without departing from the basic scope thereof, and the scope thereof is determined by the claims that follow.

What is claimed is:

1. A method of exchanging information via an annotation, comprising:
    providing a first interface allowing a first user to view query results including a first data object, select the first data object from the query results, and create an annotation with a scope encompassing the selected first data object, whereby the annotation annotates the selected first data object with metadata describing the selected first data object, and wherein the first user is authorized to view the first data object;
    providing an interface element allowing the first user to further associate the annotation with a second data object, whereby the annotation annotates both the first data object and the second data object, and wherein the first user is not authorized to view the second data object;
    providing a second interface allowing a second user to view query results including the second data object, wherein the second user is authorized to view the second data object; and
    providing, in the second interface, an indication of the annotation to the second user.

2. The method of claim 1, wherein providing an interface element allowing the first user to further associate the annotation with a second data object comprises providing an interface element allowing the user to associate the annotation with a primary key for a row of data containing the selected first data object.

3. The method of claim 1, wherein providing a first interface allowing a first user to view query results and create an annotation with a scope related to the selected first data object comprises:
    providing a selection interface allowing the first user to select one or more rows, columns, or cells of the query results; and
    providing an annotation interface allowing the first user to create an annotation for the selected one or more rows, columns, or cells.

4. The method of claim 1, wherein:
    providing an interface element allowing the first user to further associate the annotation with a second data object comprises allowing the first user to associate the annotation with a model entity encompassing the selected first data object the first user is authorized to view as well as the second data object the first user is not authorized to view; and
    the method further comprises storing the annotation with a reference to the model entity.

5. A tangible computer-readable storage medium containing a program for exchanging information via annotations which, when executed by a processor, performs operations comprising:
    providing a first interface allowing a first user to view query results, select a first data object from the query results, and create an annotation with a scope encompassing selected first data object, whereby the annotation annotates the selected first data object with metadata describing the selected data object, and wherein the first user is authorized to view the first data object;
    providing an interface element allowing the first user to further associate the annotation with a second data object, whereby the annotation annotates both the selected first data object and the second data object, and wherein the first user is not authorized to view the second data object;

providing a second interface allowing a second user to view second query results including the second data object, wherein the second user is authorized to view the second data object; and providing, in the second interface, an indication of the annotation to the second user.

6. The tangible computer-readable storage medium of claim 5, wherein providing an interface element allowing the first user to further associate the annotation with a second data object comprises providing an interface element allowing the first user to associate the annotation with a primary key for a row of data containing the selected first data object.

7. The tangible computer-readable storage medium of claim 6, wherein:

providing an interface element allowing the first user to further associate the annotation with a second data object comprises allowing the first user to associate the annotation with an entity encompassing the selected first data object and the second data object that the first user is not authorized to view; and the method further comprises storing the annotation with a reference to the entity.

8. The tangible computer-readable storage medium of claim 7, wherein:

allowing the first user to associate the annotation with an entity comprises presenting the first user with one or more entities encompassing the selected first data object and the second data object that the first user is not authorized to view; and the method further comprises storing the annotation with a reference to at least one of the one or more entities selected by the user.

9. The tangible computer-readable storage medium of claim 5, wherein the selected first data object is an instance value of a field encompassed by an entity.

10. The tangible computer-readable storage medium of claim 5, wherein the second query results do not contain the selected first data object described by the annotation.

11. The tangible computer-readable storage medium of claim 5, wherein the operations further comprise, in response to input from the second user, displaying the annotation to the second user.

12. The tangible computer-readable storage medium of claim 11, wherein the operations further comprise displaying, to the second user, the selected first data object described by the annotation.

* * * * *